Jan. 11, 1938. G. P. ROBERTS 2,105,298
BRAKE
Filed May 1, 1936 2 Sheets-Sheet 1

INVENTOR.
GLYN PIERCE ROBERTS.
BY Jerome R. Cox
ATTORNEY.

Jan. 11, 1938. G. P. ROBERTS 2,105,298
BRAKE
Filed May 1, 1936 2 Sheets-Sheet 2
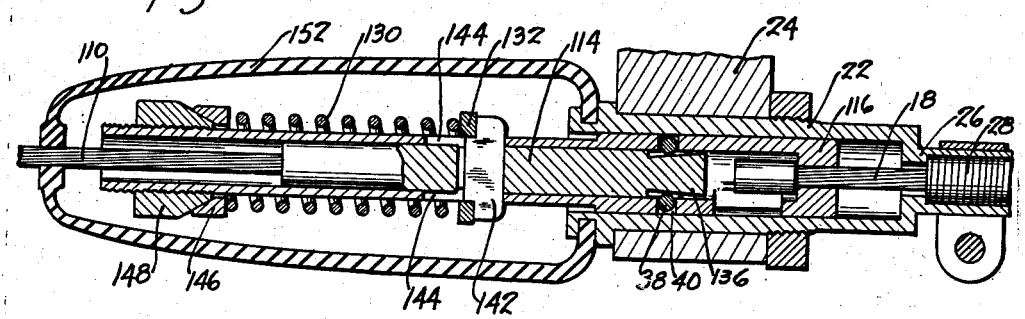
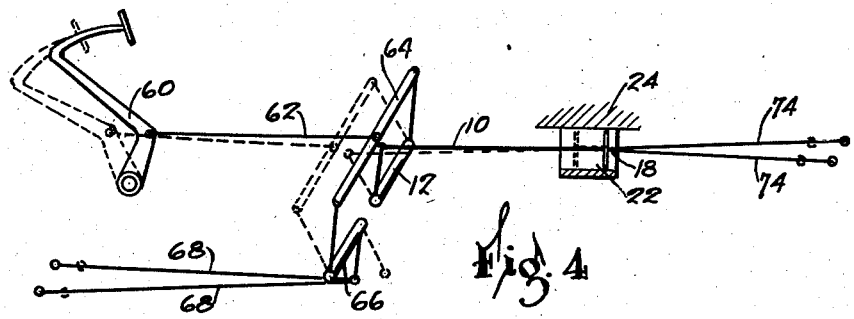
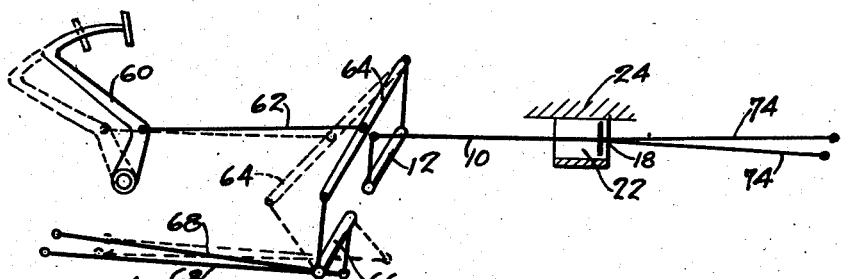
INVENTOR.
GLYN PIERCE ROBERTS
BY Jerome R. Cox
ATTORNEY.

Patented Jan. 11, 1938

2,105,298

UNITED STATES PATENT OFFICE 2,105,298

BRAKE

Glyn Pierce Roberts, Birmingham, England, assignor to Bendix Products Corporation, South Bend, Ind., a corporation of Indiana Application May 1, 1936, Serial No. 78,207
In Great Britain May 1, 1935

10 Claims. (Cl. 188—10)

This invention relates to a new or improved device for limiting the load which can be applied to a movable member. The device is particularly applicable to vehicle brakes for limiting the effort which can be applied to a brake or set of brakes but is applicable to any other mechanism in which a similar limitation of load is desirable.

One object of my invention is to provide a simple and compact device for limiting the amount of the load which can be applied, which device is positive in action and can readily be fitted in the transmission line to a brake with a minimum of alteration to existing designs of transmission lines.

A feature of my invention is a device including one member to which a load is applied and which member is axially slidable within a second member comprising a load-transmitting sleeve. The sliding movement is against the action of a preloaded spring so that so long as the loading of the spring is not exceeded there is no such relative sliding movement and the two members move together. When the loading of the spring is exceeded the inner member, to which the load is applied, moves relative to the sleeve and a coned head or equivalent means on the inner member engages wedging elements or the like such as balls or rollers normally housed in openings in the wall of the sleeve and forces these wedging elements outwardly against a fixed housing within which the sleeve is mounted. The sleeve is thus held against further movement and cannot transmit further load. The spring is preferably adjustable so that the value of the maximum load transmitted can be varied according to requirements. The device may be arranged to operate either in tension or compression, the construction in both cases being substantially the same except for the direction of taper of the coned head or equivalent means on the inner member. The invention may be carried into practice in a variety of different ways according to the purpose for which it is to be used.

Other objects and features of the invention should be apparent after a consideration of the accompanying drawings submitted in illustration of my invention in which:

Figure 3 is a sectional view showing another embodiment of my invention;

Figure 4 is a view similar to Figure 1 illustrating a light brake application; and Figure 5 is a view similar to Figures 1 and 4 illustrating a more severe brake application.

Figure 1:
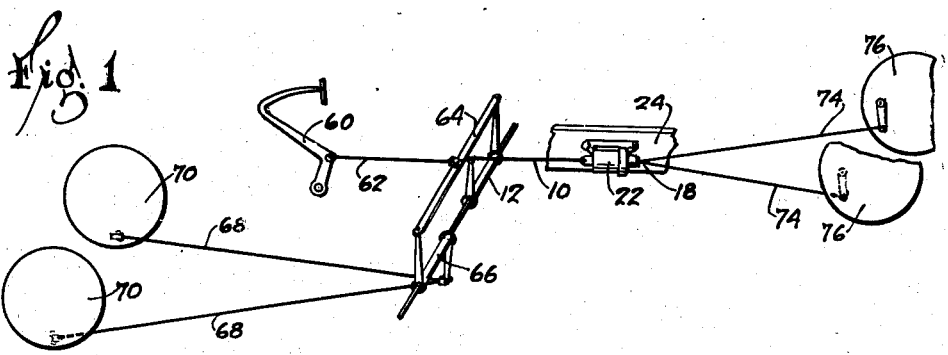
Figure 1 is a diagrammatic sketch showing a brake system incorporating my invention.
Figure 2:
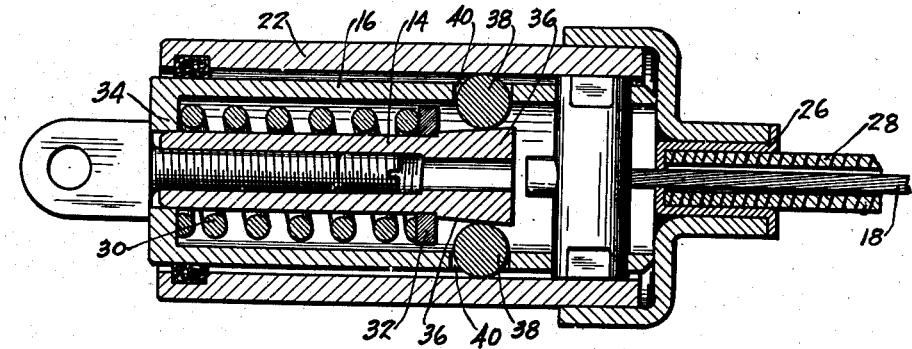
Figure 2 is a sectional view showing one form of load limiting device in detail.

In one form of my invention shown as applied to a cable-operated vehicle brake, a cable 10 from a brake cross shaft 12 is connected to one end of a plunger 14 (see Figure 2) which is axially slidable in a cylindrical sleeve 16 to which a cable 18 leading to the brakes is connected. The inner end of the sleeve is axially slidable in a housing 22 which is secured to the vehicle chassis 24 or other convenient part, and the housing 22 may also carry an abutment 26 for a flexible conduit 28 through which the cable leading to the brakes is carried. A coiled compression spring 30 fitting within the front part of the cylinder 16 abuts at its end against a washer 32 which is positioned to bear on one end of the plunger 14. An abutment for the other end of the spring is formed by a flange 34 formed on the end of the sleeve 16.

The inner end of the plunger 14 terminates in a reversely coned head 36 adapted to cooperate with round wedging elements such as the rollers 38 located in openings 40 in the wall of the sleeve 16, and in the normal position of the parts these wedging elements do not project beyond the outer surface of the sleeve.

When a pull is applied to the cable 10 attached to the plunger 14 the sleeve 16 moves with the plunger 14 and applies an equal pull to the cable 18 connected to the brakes so long as the pull does not exceed the loading of the spring 30. As soon as this loading is exceeded, however, the spring 30 begins to compress further and the plunger 14 moves outwardly relative to the sleeve 16 so that the wedging elements 38 are engaged by the coned end 36 of the plunger 14 and forced outwardly against the inner face of the housing 22 to lock the sleeve 16 against further movement. The loading of the spring 30 thus determines the maximum tension which can be applied to the brake cable 18.

The coned end of the plunger and the inner surface of the housing are hardened so that wear is negligible and the device will operate indefinitely without attention.

In the arrangement shown in Figure 3 similar parts are designated by the same numerals with the addition of 100. The spring 130 however fits around the front part of the sleeve 116 and abuts at its inner end against a washer 132 which is slidable on the sleeve 116 but bears against a flat or other cotter 142 extending transversely through the sleeve and plunger. The cotter is a good fit in the plunger but extends through opposed longitudinal slots 144 in the sleeve. An abutment for the other end of the spring is formed by a washer 146 backed by a nut 148 adjustably screwed on to the outer end of the sleeve so that the initial compression of the spring can be adjusted. The engaging faces of the washer 146 and nut 148 may be oppositely coned so that the pressure of the spring acting on the washer compresses the coned end of the nut on to the sleeve and locks it, or any other means may be employed by locking the nut in the adjusted position. Normally the spring pressing on the washer at its inner end holds the cotter 142 against the inner end of the slots 144.

Preferably a flexible cover 152 is fitted over the outer end of the plunger and sleeve to prevent entry of water and dust into the device.

In the brake system shown in illustration of my invention, the pedal 60 is connected by a cable 62 with an equalizer 64 which operates cross shaft 12 and also cross shaft 66. The shaft 66 is connected by cables 68 to operate front brakes 70. The cable 18 is connected to cables 74 to actuate rear brakes 76.

It is to be understood that the above-described embodiments of my invention are for the purpose of illustration only and various changes may be made without departing from the spirit and scope of my invention.

I claim:

1. A load limiting device comprising a plunger formed with a cone-shaped portion, a sleeve, a housing, a spring effectively interposed between said sleeve and said plunger, wedging elements, means including said cone-shaped portion and operated by relative movement between said plunger and said sleeve for forcing said wedging elements into contact with said housing to lock the sleeve thereto a member mounted crosswise of the sleeve beyond the end of the plunger, a cap over the end of the housing having a seat for the end of a conduit, a conduit having its end in said seat, and a cable extending through the conduit and through said cap and secured to said member.

2. A load limiting device comprising a fixed member, two members movable relative to said fixed member and to each other, wedging elements operated by relative movement between said movable members for engaging said fixed member to lock one of the movable members thereto, a brake pedal, two sets of brakes, an equalizer, connections between said pedal and said equalizer, connections between said equalizer and one of said sets of brakes, a connection between said equalizer and one said movable member, and a connection between the other said brakes and said other movable member.

3. A load limiting device comprising a fixed member, two members movable relative to said fixed member and to each other, wedging elements operated by relative movement between said movable members for engaging said fixed member to lock one of the movable members thereto, a brake pedal, rear brakes, front brakes, an equalizer, connections between said pedal and said equalizer, connections between said equalizer and said front brakes, a connection between said equalizer and one said movable member, and a connection between said rear brakes and said other movable member.

4. A load limiting device for an automobile having a chassis comprising a housing member fixed to said chassis, a sleeve and a plunger movable relative to said fixed member and to each other, wedging rollers operated by relative movement between said sleeve and plunger for engaging said fixed member to lock said sleeve thereto, a brake pedal, front brakes, rear brakes, an equalizer, connections between said pedal and said equalizer, connections between said equalizer and said front brakes, a connection between said equalizer and said plunger, and a connection between said rear brakes and said sleeve.

5. A load limiting device for an automobile having a chassis comprising a housing member fixed to said chassis, two members movable relative to said fixed member and to each other, wedging elements operated by relative movement between said movable members for engaging said fixed member to lock one of the movable members thereto, a brake pedal, two sets of brakes, an equalizer, connections between said pedal and said equalizer, connections between said equalizer and one said set of brakes, a connection between said equalizer and said one movable member, and a connection between said rear brakes and said other movable member.

6. A load limiting device comprising a pair of relatively movable members one being a plunger formed with a slot and having a cone-shaped portion, and the other being a sleeve which is also formed with a slot and within which said plunger extends, a housing, a spring effectively interposed between said sleeve and said plunger, wedging rollers, means including said cone-shaped portion operated by relative movement between said plunger and said sleeve for forcing said wedging rollers into contact with said housing to lock the sleeve thereto, and a pin on which said spring bears extending through said slots and fitting tightly in the slot of the plunger and loosely in the slot in the sleeve.

7. A load limiting device comprising a pair of relatively movable members one being a plunger formed with a slot and having a cone-shaped portion, and the other being a sleeve which is also formed with a slot and within which said plunger extends, a housing, a spring effectively interposed between said sleeve and said plunger, wedging rollers, means including said cone-shaped portion operated by relative movement between said plunger and said sleeve for forcing said wedging rollers into contact with said housing to lock the sleeve thereto, and a pin on which said spring bears extending through said slots and fitting tightly in the slot of one of the members and loosely in the slot in the other.

8. A load limiting device comprising a fixed housing, a plunger formed with a slot and having a cone-shaped portion and a sleeve which is also formed with a slot and within which said plunger extends movable relative to said fixed housing and to each other, wedging rollers operated by relative movement between said movable plunger and said sleeve for forcing said rollers into contact with said fixed housing to lock the sleeve thereto, front brakes, rear brakes, an equalizer, connections between said pedal and said equalizer, connections between said equalizer and said front brakes, a connection between said equalizer and said plunger, a connection between said rear brakes and said sleeve, a pin extending through said slots and fitting tightly in the slot in the plunger, and a spring bearing at one end on said pin and its opposite end on the sleeve.

9. A load limiting device comprising a plunger formed with a slot, a sleeve also formed with a slot, a housing, a spring effectively interposed between said sleeve and said plunger, wedging elements, means operated by relative movement between said plunger and said sleeve for engaging said wedging elements with said housing to lock the sleeve thereto, and a pin fitting tightly in said slot in the plunger and extending loosely through the slot in the sleeve, said spring bearing at one end on said pin and at the opposite end on said sleeve.

10. A load limiting device for brakes for an automobile having a chassis comprising a plunger, a sleeve, a housing secured to said chassis, a spring effectively interposed between said sleeve and said plunger, wedging elements, and means operated by relative movement between said plunger and said sleeve for engaging said wedging elements with said housing to lock the sleeve thereto, a brake pedal, two sets of brakes, an equalizer, a connection between said pedal and said equalizer, a cable connected to said equalizer and to one of said sets of brakes, a cable connected to said equalizer and to said plunger, a conduit secured to said housing, and a cable secured to said sleeve at one end, extending through said conduit and secured to said other set of brakes at its opposite end.

GLYN PIERCE ROBERTS.